US007142871B2

(12) United States Patent
Kono (10) Patent No.: US 7,142,871 B2
(45) Date of Patent: Nov. 28, 2006

(54) VIRTUAL IMAGE ELIMINATING APPARATUS AND METHOD AT THE TIME WHEN POSITION OF RADIO WAVE TRANSMITTING SOURCE IS MEASURED

(75) Inventor: Kenji Kono, Tokyo (JP)

(73) Assignee: NEC Corporation, Tokyo (JP)

( * ) Notice: Subject to any disclaimer, the term of this patent is extended or adjusted under 35 U.S.C. 154(b) by 812 days.

(21) Appl. No.: 10/382,462

(22) Filed: Mar. 6, 2003

(65) Prior Publication Data

US 2004/0203917 A1  Oct. 14, 2004

(30) Foreign Application Priority Data

Mar. 13, 2002  (JP)  ............... 2002-069014

(51) Int. Cl.
  *H04Q 7/20*  (2006.01)
  *H04B 17/00*  (2006.01)
(52) U.S. Cl. .................. 455/456.1; 455/67.11; 455/457
(58) Field of Classification Search .... 455/67.11–67.7, 455/456.1–456.5, 457, 422.1; 342/450, 451
  See application file for complete search history.

(56) References Cited

U.S. PATENT DOCUMENTS

| 5,008,543 A | 4/1991 | Bertrand et al. | |
| 6,188,356 B1* | 2/2001 | Kitayoshi | ............... 342/451 |

FOREIGN PATENT DOCUMENTS

| JP | 5-272955 | 10/1993 |
| JP | 8-262121 | 10/1996 |
| JP | 08-262121 A | 10/1996 |
| JP | 10-132922 | 5/1998 |
| JP | 10-142325 A | 5/1998 |
| JP | 10-170623 A | 6/1998 |
| JP | 2003-194907 A | 7/2003 |

OTHER PUBLICATIONS

S. Shibuya, "The General Theory of Microwave Propagation," Corona Publishing Co., Ltd., Tokyo, Japan, (1968).
NTT Communications, "The air access: broad band course," JP AOL.com.
A. Okamura et al., "A Deghosting Algorithm Using Cross-Correlation in Triangulate Positioning Systems," Electronics and Communications in Japan, Part 1, (Communications) Scripta Technical USA, vol. 83, No. 5, 2000, pp. 37-46.

* cited by examiner

*Primary Examiner*—Benny Q. Tieu
(74) *Attorney, Agent, or Firm*—Foley & Lardner LLP (57) ABSTRACT

A virtual image eliminating apparatus and its method at the time when the position of a radio wave transmitting source is measured, in which the virtual image is eliminated automatically with high reliability, are provided. The virtual image eliminating apparatus provides plural bearing measuring instruments and a controlling and displaying instrument. The controlling and displaying instrument receives the measured results from the plural bearing measuring instruments. The controlling and displaying instrument calculates estimated radio wave transmitting intensity in all of the combinations of bearing lines, which formed an intersection point. And the controlling and displaying instrument judges whether each of the intersection points is a real image or a virtual image based on the difference between the estimated radio wave transmitting intensity in one combination of the bearing lines formed the intersection point. And the controlling and displaying instrument displays the bearing lines and the real image and the virtual image.

6 Claims, 7 Drawing Sheets

(a) COMBINATION OF BEARING LINES FORMED INTERSECTION POINT 1

| BEARING MEASURING INSTRUMENT | MEASURED RECEPTION LEVEL | RADIO WAVE PROPAGATION LOSS BETWEEN BEARING MEASURING INSTRUMENT & INTERSECTION POINT 1 | ESTIMATED RADIO WAVE TRANSMITTING INTENSITY | JUDGEMENT |
|---|---|---|---|---|
| 20-1 | 40 | 25 | 65 | REAL IMAGE |
| 20-3 | 50 | 12 | 62 | |

(b) COMBINATION OF BEARING LINES FORMED INTERSECTION POINT 2

| BEARING MEASURING INSTRUMENT | MEASURED RECEPTION LEVEL | RADIO WAVE PROPAGATION LOSS BETWEEN BEARING MEASURING INSTRUMENT & INTERSECTION POINT 2 | ESTIMATED RADIO WAVE TRANSMITTING INTENSITY | JUDGEMENT |
|---|---|---|---|---|
| 20-1 | 40 | 10 | 50 | VIRTUAL IMAGE |
| 20-2 | 10 | 15 | 25 | |

DIFFERENCE RANGE : 5; WHEN DIFFERENCE IN ESTIMATED RADIO WAVE TRANSMITTING INTENSITY IS 5 OR SMALLER, INTERSECTION POINT IS JUDGED AS REAL IMAGE.

FIG. 7

VIRTUAL IMAGE ELIMINATING APPARATUS AND METHOD AT THE TIME WHEN POSITION OF RADIO WAVE TRANSMITTING SOURCE IS MEASURED

BACKGROUND OF THE INVENTION

The present invention relates to a virtual image eliminating apparatus and its method at the time when the position of a radio wave transmitting source is measured, in particular, in which the virtual image is eliminated automatically.

DESCRIPTION OF THE RELATED ART

Conventionally, in order to accurately measure the position of a radio wave transmitting source, a virtual image eliminating apparatus and its method are required. However, actually, eliminating the virtual image has largely depended on the skill of an observer of the virtual image eliminating apparatus. That is, the observer estimates the position of a radio wave transmitting source by observing bearing lines from the radio wave transmitting source, intersection points of the bearing lines, and measured reception levels of the radio wave transmitting source, which are changed in the passage of time, displaying on a controlling and displaying instrument in the virtual image eliminating apparatus, by using the skill of the observer.

Figure 1:
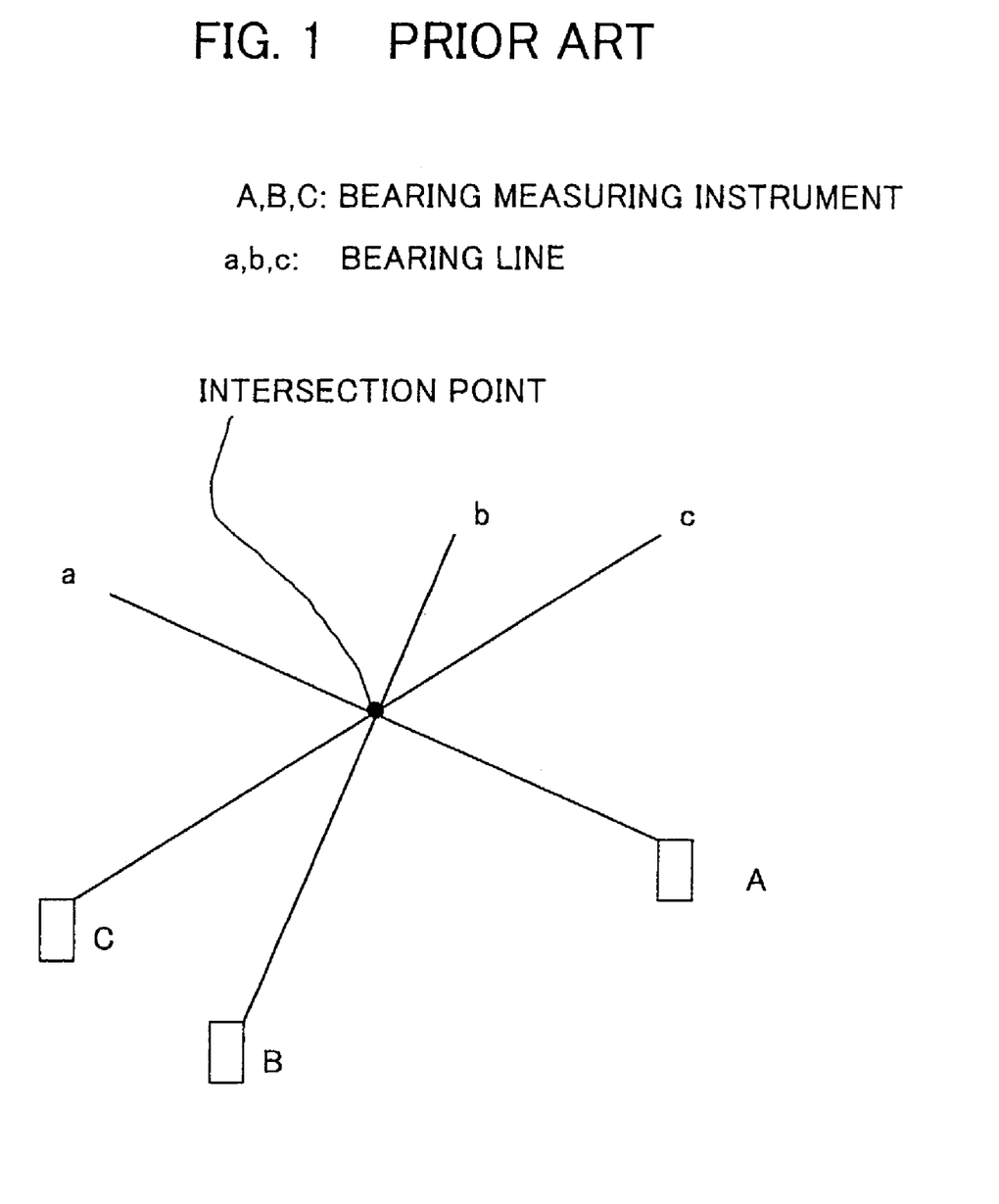
FIG. 1 is a first conceptual diagram showing a relation among the positions of bearing measuring instruments and respective bearing lines and an intersection point of the bearing lines at a conventional example.
Figure 2:
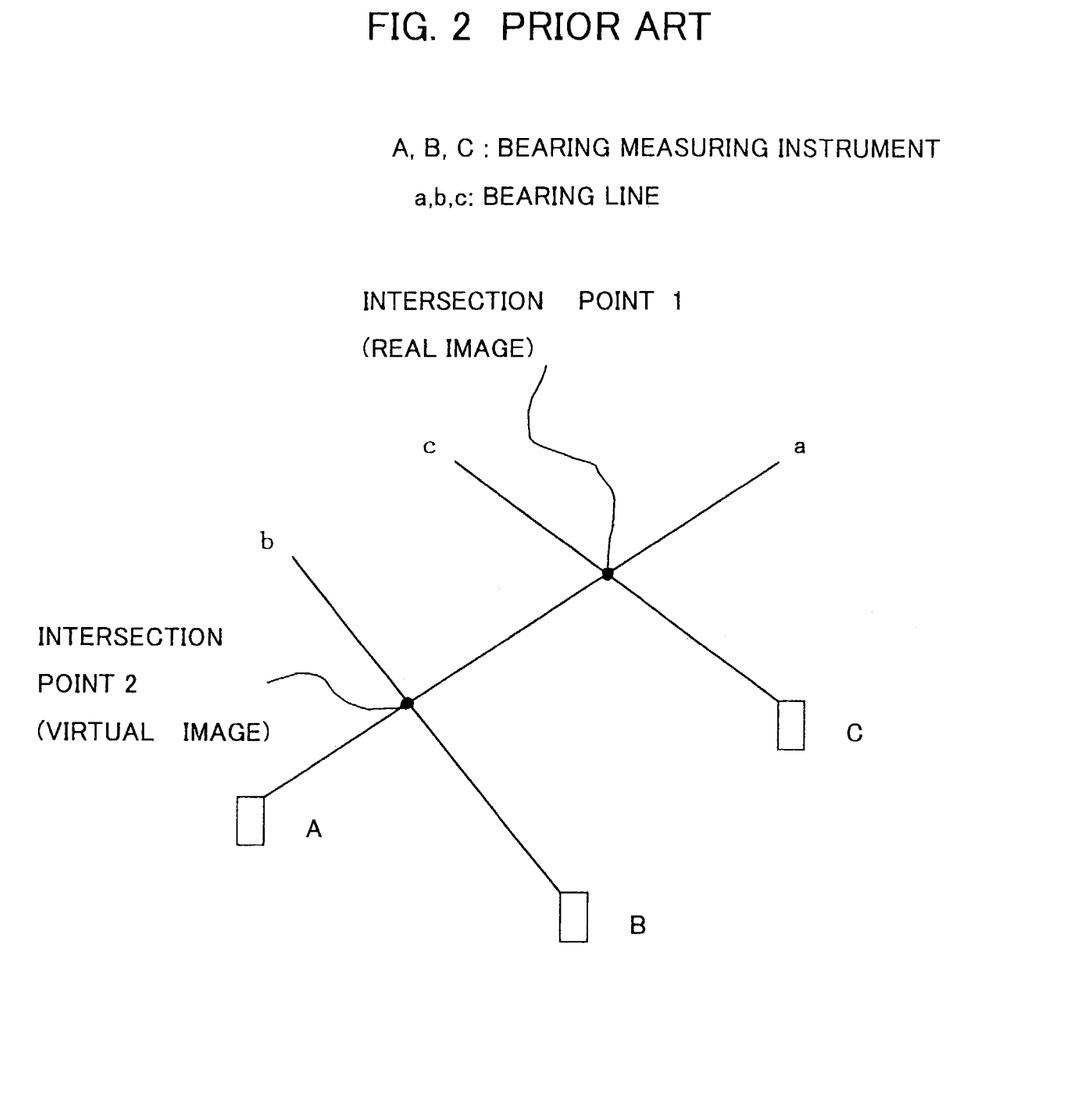
FIG. 2 is a second conceptual diagram showing a relation among the positions of bearing measuring instruments and respective bearing lines and intersection points of the bearing lines at a conventional example.

FIG. 1 is a first conceptual diagram showing a relation among the positions of bearing measuring instruments A, B, and C, and respective bearing lines, and an intersection point of the bearing lines at a conventional example. FIG. 2 is a second conceptual diagram showing a relation among the positions of bearing measuring instruments A, B, and C, and respective bearing lines, and intersection points of the bearing lines at a conventional example.

In FIG. 1, in order to measure a radio wave transmitting source, plural bearing measuring instruments are used to measure the arriving directions of a radio wave. Each of the arriving directions of the radio wave, measured by the each of the plural bearing measuring instruments, is drawn on a map. In this, each of the arriving directions of the radio wave is named as a bearing line. The intersection point of the plural bearing lines is measured as the position of the radio wave transmitting source. In FIG. 1, there are three bearing measuring instruments A, B, and C, and three bearing lines a, b, and c, however, the intersection point is one, therefore, the position of the intersection point is measured as the radio wave transmitting source.

However, as shown in FIG. 2, although the radio wave transmitting resource is one, there is a case that the intersection points are plural, caused by the angles of the bearing lines. In FIG. 2, the three bearing measuring instruments A, B, and C were used and two intersection points 1 and 2 occurred by the three bearing lines a, b, and c. The intersection point, which shows the actual radio wave transmitting source, is one and the intersection point 1, and the other intersection point 2 looks like a radio wave transmitting source but does not exist actually. This intersection point 2 is called as a virtual image, and the intersection point 1 is called as a real image.

There are several causes to change the bearing lines, the intersection points, and the measured reception levels.

Radio waves are attenuated by weather conditions, being the one of the causes mentioned above. This attenuation is reported on the web site of NTT Communications Corporation. The air access: broad band course in this web site describes this subject. In this course, as the weather conditions to attenuate the radio waves, attenuation by an atmosphere, attenuation by rain, attenuation by snow, and so fourth are reported.

"The General Theory of Microwave Propagation" written by S. Shibuya, published by Corona Publishing Co., Ltd., 1968, describes a propagation loss, a span loss, an effective propagation loss, Fresnel zones, a diffraction loss, and so forth, when a radio wave is diffracted in a free space.

Japanese Patent Application Laid-Open No. HEI 5-272955 discloses a displacement measuring method and its apparatus. In this patent application, the displacement of a moving object is measured by using a sound wave, a light wave, or a radio wave. And the amounts of the displacement in the plural different directions are measured by one set of a receiver and a transmitter, by measuring the delayed time and the attenuated amount of the wave.

Japanese Patent Application Laid-Open No. HEI 10-132922 discloses a radio wave receiving apparatus. In this patent application, when a ship on a sea detects the position of a radio wave transmitting source, unnecessary signals reflected from objects on lands adjacent to the ship are eliminated accurately and surely. In order to achieve this, in case that unnecessary objects reflecting signals exist between the absolute position of its own ship and the measured bearing line, a detecting reference value is set for not detecting the reflected signals from the unnecessary objects.

However, at the conventional methods mentioned above, an observer estimates the position of a target radio wave transmitting source by using his/her own skill. Consequently, it becomes necessary for the observer to always check the measured results on a controlling and displaying instrument. Further, the accuracy of the final judgement, whether the target on the controlling and displaying instrument is a real image or a virtual image, largely depends on the skill of the observer.

Moreover, at the conventional methods, which measure bearing lines, intersection points, and reception levels, which are changed in the passage of time, and displays the measured results on a controlling and displaying instrument, an algorithm for realizing the skill of the observer by software has not been developed.

SUMMARY OF THE INVENTION

It is therefore an object of the present invention to provide a virtual image eliminating apparatus and its method at the time when the position of a radio wave transmitting source is measured, in which the virtual image is eliminated automatically with high reliability.

According to a first aspect of the present invention, for achieving the object mentioned above, there is provided a virtual image eliminating apparatus at the time when the position of a radio wave transmitting source is measured. The virtual image eliminating apparatus provides plural bearing measuring instruments, positioned at different places each other, for measuring data being a bearing line and a reception level of a radio wave transmitted from the radio wave transmitting source, and a controlling and displaying instrument for displaying the position of the radio wave transmitting source by processing data, which were measured at the plural bearing measuring instruments and were transmitted to the controlling and displaying instrument. And in case that intersection points formed by the bearing lines from the plural bearing measuring instruments are two or more, the controlling and displaying instrument calculates estimated radio wave transmitting intensity in all of the combinations of bearing lines, which formed one of the two or more intersection points, and judges whether each of the two or more intersection points is a real image or a virtual image based on the difference between the estimated radio wave transmitting intensity in one combination of the bearing lines formed one of the two or more intersection points.

According to a second aspect of the present invention, in the first aspect, the estimated radio wave transmitting intensity is calculated from, the reception level measured at one of the plural bearing measuring instruments, and a radio wave propagation loss between one of the plural bearing measuring instruments and the intersection point in a combination of bearing lines formed the one of the two or more intersection points, calculated at the controlling and displaying instrument.

According to a third aspect of the present invention, in the first aspect, the difference between the estimated radio wave transmitting intensity in one combination of the bearing lines formed one of the two or more intersection points is compared with a predetermined value. And when the difference between the estimated radio wave transmitting intensity in one combination of the bearing lines formed one of the two or more intersection points is the predetermined value or smaller than the predetermined value, the one of the two or more intersection points is judged as the real image. And when the difference between the estimated radio wave transmitting intensity in one combination of the bearing lines formed one of the two or more intersection points is larger than the predetermined value, the one of the two or more intersection points is judged as the virtual image.

According to a fourth aspect of the present invention, for achieving the object mentioned above, there is provided a virtual image eliminating method at the time when the position of a radio wave transmitting source is measured. The virtual image eliminating method provides the steps of, measuring data being a bearing line and a reception level of a radio wave transmitted from the radio wave transmitting source by plural bearing measuring instruments positioned at different places each other, receiving the measured data, and displaying the position of the radio wave transmitting source by processing the received measured data. And in case that intersection points formed by the bearing lines from the plural bearing measuring instruments are two or more, the virtual image eliminating method further provides the steps of, calculating estimated radio wave transmitting intensity in all of the combinations of bearing lines, which formed one of the two or more intersection points, and judging whether each of the two or more intersection points is a real image or a virtual image based on the difference between the estimated radio wave transmitting intensity in one combination of the bearing lines formed one of the two or more intersection points.

According to a fifth aspect of the present invention, in the fourth aspect, the estimated radio wave transmitting intensity is calculated from the reception level measured at one of the plural bearing measuring instruments and a radio wave propagation loss between one of the plural bearing measuring instruments and the intersection point in a combination of bearing lines formed the one of the two or more intersection points.

According to a sixth aspect of the present invention, in the fourth aspect, the difference between the estimated radio wave transmitting intensity in one combination of the bearing lines formed one of the two or more intersection points is compared with a predetermined value. And when the difference between the estimated radio wave transmitting intensity in one combination of the bearing lines formed one of the two or more intersection points is the predetermined value or smaller than the predetermined value, the one of the two or more intersection points is judged as the real image. And when the difference between the estimated radio wave transmitting intensity in one combination of the bearing lines formed one of the two or more intersection points is larger than the predetermined value, the one of the two or more intersection points is judged as the virtual image.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, embodiments of the present invention are explained in detail. At the embodiments of the present invention, in order to realize the automatic elimination of a virtual image, which was not able to be judged automatically in the conventional methods, a radio wave propagation loss calculation, based on configuration information (altitude information), is adopted.

Figure 3:
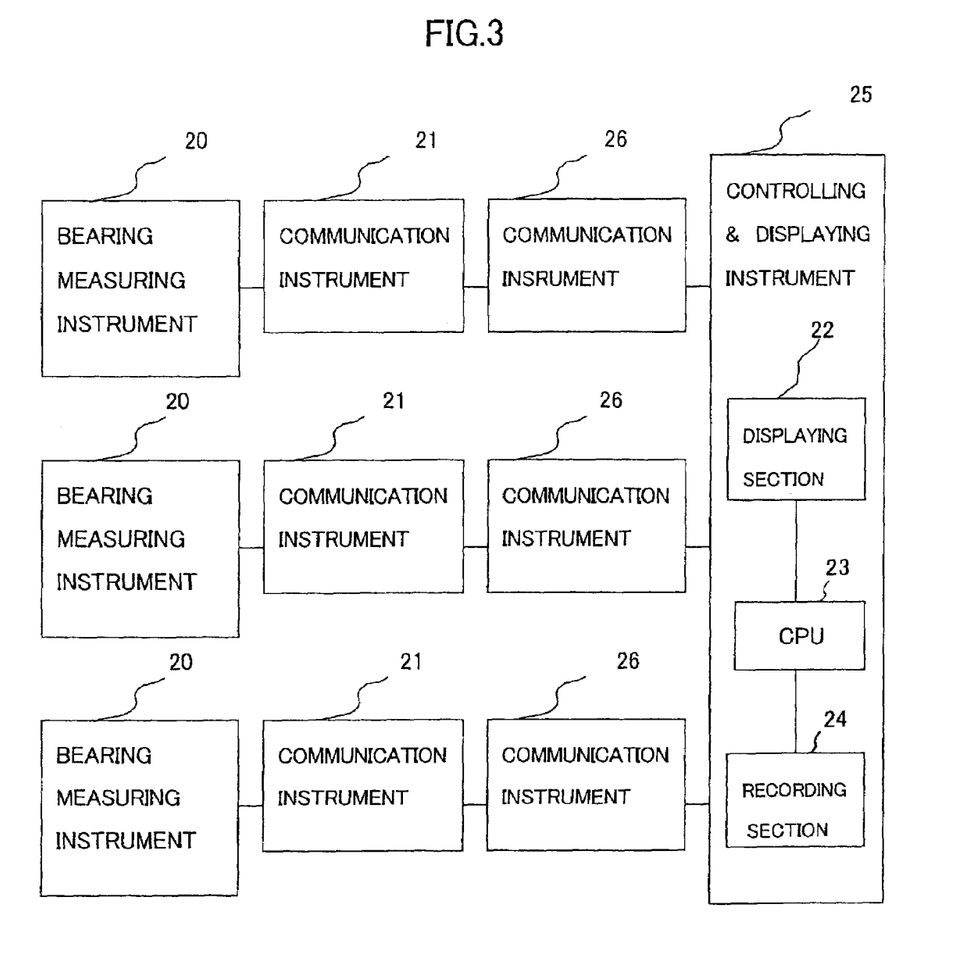
FIG. 3 is a block diagram showing a structure of a virtual image eliminating apparatus at the embodiments of the present invention.

FIG. 3 is a block diagram showing a structure of a virtual image eliminating apparatus at the embodiments of the present invention. As shown in FIG. 3, the virtual image eliminating apparatus at the embodiments of the present invention consists of three bearing measuring instruments 20, three first communication instruments 21, a controlling and displaying instrument 25, and three second communication instruments 26.

Each of the three bearing measuring instruments 20 measures the arriving direction (bearing line) of a radio wave from a radio wave transmitting source. Each of the first communication instruments 21 is connected to corresponding one of the bearing measuring instruments 20 and transmits the measured result at the corresponding bearing measuring instrument 20 to corresponding one of the second communication instruments 26. Each of the second communication instruments 26 is connected to the controlling and displaying instrument 25 and receives the measured result transmitted from corresponding one of the first communication instruments 26, and sends the received measured result to the controlling and displaying instrument 25. Each of the first communication instruments 21 and corresponding each of the second communication instruments 26 are connected with a wire line or a radio line.

The controlling and displaying instrument 25 receives the measured results from the bearing measuring instruments 20 via the first communication instruments 21 and the second communication instruments 26. And the controlling and displaying instrument 25 processes the received measured results and displays the position of the radio wave transmitting source on a map.

The controlling and displaying instrument 25 consists of a displaying section 22, a CPU 23, and a recording section 24. The CPU 23 is operated by computer program control. The displaying section 22 displays the measured results, processed at the CPU 23, on the map. The recording section 24 records the measured results.

At the structure mentioned above, the number of the bearing measuring instruments 20, the first communication instruments 21, and the second communication instruments 26 is three. However, the number is not limited to three, and generally the number is three or more, and at least the number is two.

Next, referring to the drawings, the operation of the virtual image eliminating apparatus at a first embodiment of the present invention is explained. Before explaining the operation, FIGS. 4 to 7 are explained.

Figure 4:
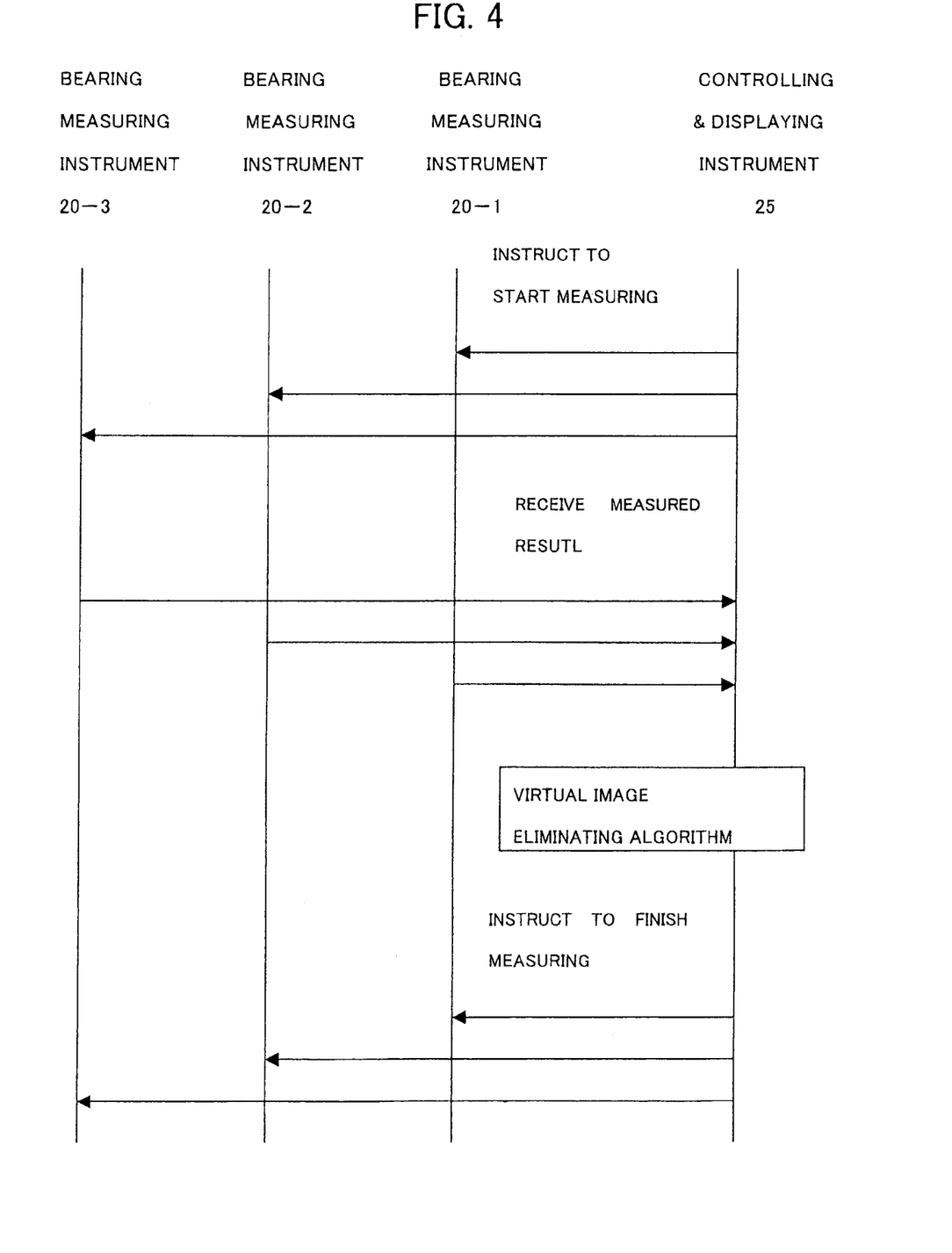
FIG. 4 is a diagram showing processes measuring bearing lines and reception levels between a controlling and displaying instrument and bearing measuring instruments at the embodiments of the present invention.

FIG. 4 is a diagram showing processes measuring the bearing lines and the reception levels between the controlling and displaying instrument 25 and the bearing measuring instruments 20-1, 20-2, and 20-3 at the embodiments of the present invention.

Figure 5:
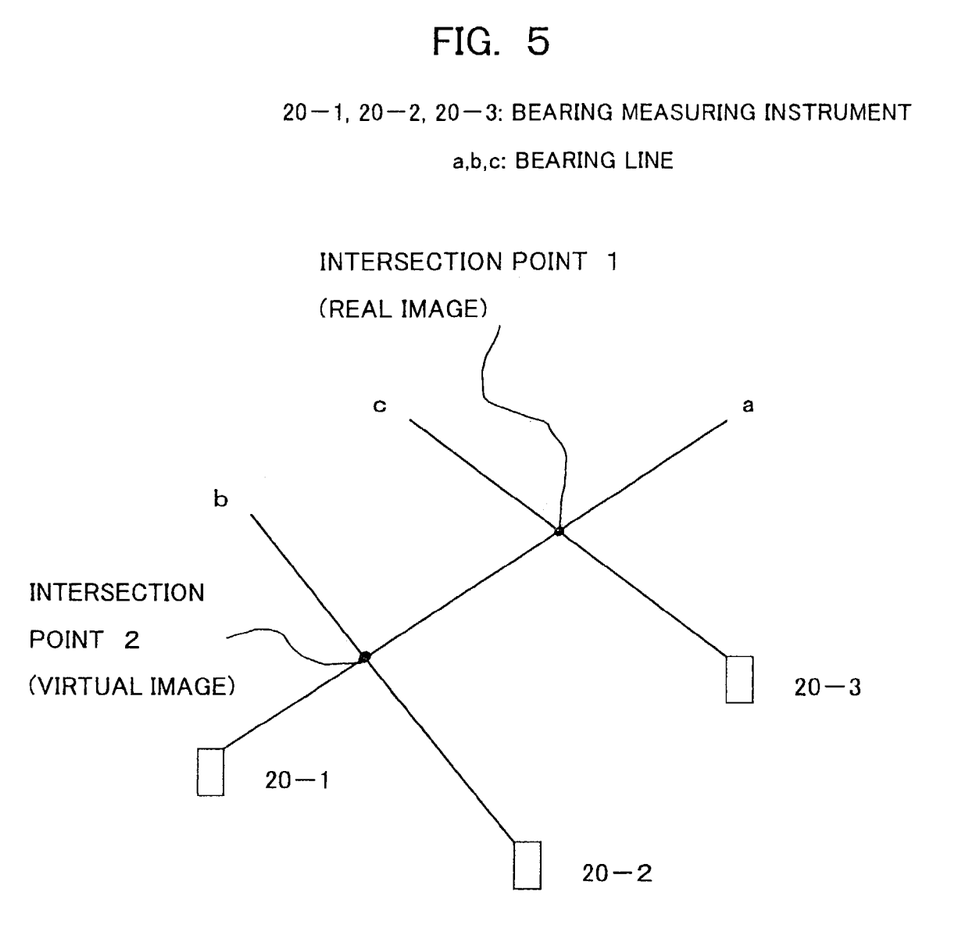
FIG. 5 is a diagram showing a relation among the positions of the bearing measuring instruments and respective bearing lines and intersection points of the bearing lines at the embodiments of the present invention.
Figure 6:
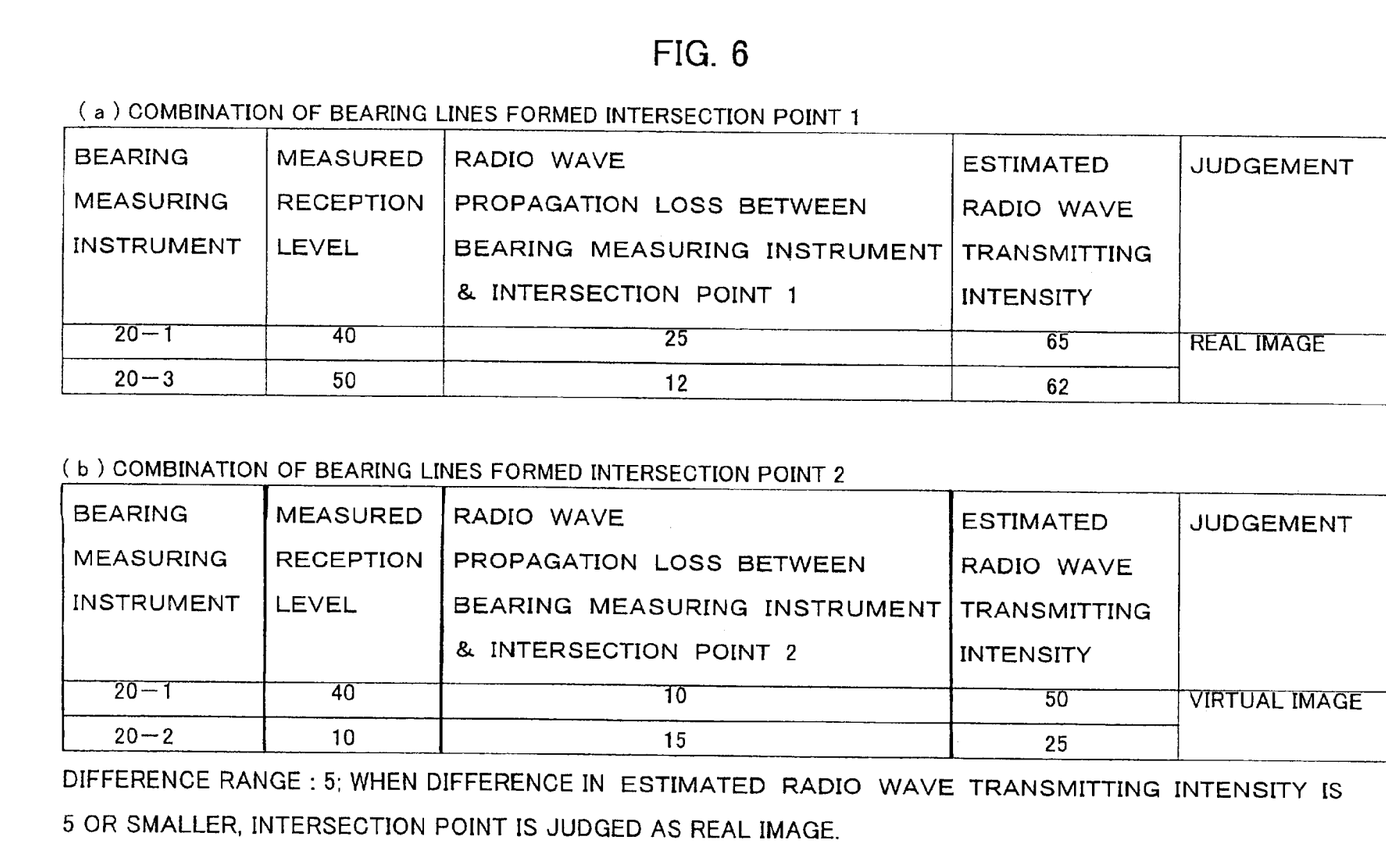
FIGS. 6A and 6B are a diagram showing estimated radio wave transmitting intensity at intersection points at a first embodiment of the present invention.

In FIGS. 4 to 6, each of the three bearing measuring instruments is shown with corresponding independent reference number 20-1, 20-2, and 20-3.

FIG. 5 is a diagram showing a relation among the positions of the bearing measuring instruments 20-1, 20-2, and 20-3, and respective bearing lines, and intersection points of the bearing lines at the embodiments of the present invention. In FIG. 5, the bearing lines are shown with letters "a", "b", and "c", and the intersection point 1 shows the position of a radio wave transmitting source, that is, a real image is shown at the intersection point 1. And also, the intersection point 2 shows the position of a virtual image.

FIG. 6 is a diagram showing estimated radio wave transmitting intensity at intersection points at the first embodiment of the present invention. In FIG. 6(a), the estimated radio wave transmitting intensity at the intersection point 1 (shown in FIG. 5) is shown. In FIG. 6(b), the estimated radio wave transmitting intensity at the intersection point 2 (shown in FIG. 5) is shown. By using the estimated radio wave transmitting intensity, the intersection point is a real image or a virtual image is judged. The calculating method of the estimated radio wave transmitting intensity and the judging method, whether an intersection point is a real image or a virtual image, are explained in detail later.

Figure 7:
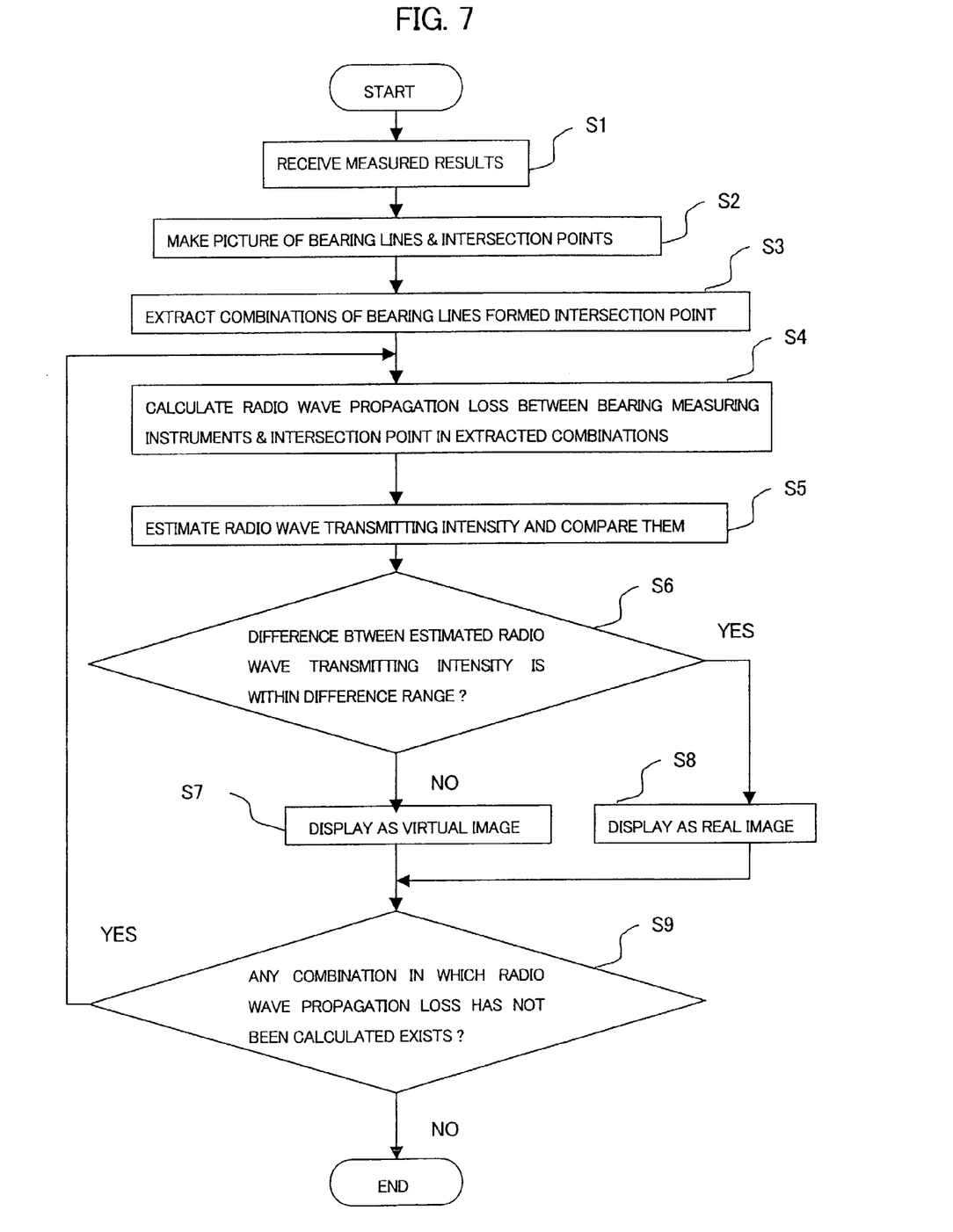
FIG. 7 is a flowchart showing the operation of the virtual image eliminating apparatus at the first embodiment of the present invention.

FIG. 7 is a flowchart showing the operation of the virtual image eliminating apparatus at the first embodiment of the present invention.

At executing the judgement whether an intersection point is a real image or a virtual image, the radio wave transmitting intensity is estimated at each intersection point where the bearing lines of two bearing measuring instruments intersect. That is, the estimated radio wave transmitting intensity at an intersection point has two values, for two bearing measuring instruments. When the difference between the two estimated radio wave transmitting intensity is small, the intersection point can be judged as a real image. For its judgment, its difference range between the two estimated radio wave transmitting intensity is set as a parameter beforehand. At the embodiment of the present invention, the parameter is set to be, for example, "5". That is, when the difference is 5 or less, the intersection point is judged as a real image. The unit of the value "5" is, for example, "dB".

Referring mainly to FIG. 7, the operation of the virtual image eliminating apparatus at the first embodiment of the present invention is explained. In this explanation, the step number shows the step number shown in FIG. 7.

First, the controlling and displaying instrument 25 instructs the bearing measuring instruments 20-1 to 20-3 to start measuring the arriving directions (bearing lines) and the reception levels of a radio wave transmitted from a radio wave transmitting source. And the bearing measuring instruments 20-1 to 20-3 measure the bearing lines and the reception levels of the radio wave transmitted from the radio wave transmitting source. And the controlling and displaying instrument 25 receives the measured results from the bearing measuring instruments 20-1 to 20-3, via the first and second communication instruments 21 and 26 (step S1). The controlling and displaying instrument 25 processes the measured results at the CPU 23 and makes a picture of the bearing lines and intersection points (step S2). For example, a picture shown in FIG. 5 is obtained.

Next, the CPU 23 in the controlling and displaying instrument 25 extracts combinations of the bearing lines, which formed an intersection point (step S3). And the CPU 23 in the controlling and displaying instrument 25 calculates the propagation loss between each of the bearing measuring instruments and the intersection point in the extracted combination (step S4). And the CPU 23 in the controlling and displaying instrument 25 estimates the radio wave transmitting intensity from the radio wave transmitting source, and compares the two estimated radio wave transmitting intensity in the combination (step S5).

As explained before, in FIG. 6(a), the estimated radio wave transmitting intensity at the intersection point 1 (shown in FIG. 5) is shown, that is, the combination of bearing lines from the bearing measuring instruments 20-1 and 20-3 formed the intersection point 1. In FIG. 6(a), the bearing measuring instruments 20-1 and 20-3, the measured reception level at each of the bearing measuring instruments 20-1 and 20-3, the propagation loss between each of the bearing measuring instruments 20-1 and 20-3 and the intersection point 1, which were calculated at the CPU 23 in the controlling and displaying instrument 25, are shown. Further, in FIG. 6(a), the estimated radio wave transmitting intensity is obtained by adding the measured reception level and the calculated propagation loss, is shown, and also its judgement is shown. In FIG. 6(b), the estimated radio wave transmitting intensity at the intersection point 2 (shown in FIG. 5) is shown, that is, the combination of bearing lines from the bearing measuring instruments 20-1 and 20-2 formed the intersection point 2. In FIG. 6(b), the combination at the intersection point 2 is explained, but the expressions are the same as those in FIG. 6(a), therefore, the detailed explanation is omitted.

Next, the CPU 23 in the controlling and displaying instrument 25 checks whether the difference between the estimated radio wave transmitting intensity in each combination of the bearing lines is within the difference range or not (step S6).

At the embodiments of the present invention, as mentioned before, the difference range has been set to be "5" as a parameter. Therefore, when the difference between the estimated radio wave transmitting intensity in each of the combination of the bearing lines, which formed an intersection point, is within "5", the intersection point is judged as a real image. In FIG. 6(a), the difference between the estimated radio wave transmitting intensity in the combination of the bearing lines, which formed the intersection point 1, is 3 (65−62), therefore, the intersection point 1 is judged as a real image. In FIG. 6(b), the difference between the estimated radio wave transmitting intensity in the combination of the bearing lines, which formed the intersection point 2, is 25 (50−25), therefore, the intersection point 2 is judged as a virtual image.

When the difference between the estimated radio wave transmitting intensity in each combination of the bearing lines is within the difference range "5" (YES at the step S6), the intersection point is shown as a real image on the displaying section 22 (step S8). If not (NO at the step S6), the intersection point is shown as a virtual image on the displaying section 22 (step S7).

After this, the controlling and displaying instrument 25 checks whether any combination of bearing lines in which the radio wave propagation loss has not been calculated exists or not (step S9). When some combination of bearing lines in which the radio wave propagation loss has not been calculated exists (YES at the step S9), the steps from S4 to S9 are repeated until the propagation losses at all of the combinations are calculated. When the confirmation of all of the combinations finished, the operation ends.

Next, referring to the drawings, the processes between the controlling and displaying instrument 25 and the bearing measuring instruments 20-1 to 20-3 are explained in more detail. As shown in FIG. 4, the controlling and displaying instrument 25 instructs the plural bearing measuring instruments 20-1 to 20-3 to start measuring by specifying parameters such as a measuring frequency and a gain, being necessary for the measurement.

Each of the plural bearing measuring instruments 20-1, 20-2, and 20-3, which received the instruction to start the measurement, measures the arriving direction of a radio wave and the reception level of the radio wave based on the specified parameters, and transmits the measured results to the controlling and displaying instrument 25 via each of the first and the second communication instruments.

The controlling and displaying instrument 25 eliminates a virtual image by applying a virtual image eliminating algorithm to the received measured results, and makes the displaying section 22 display the eliminated result, and also makes the recording section 24 record the eliminated result. In this, by not eliminating the virtual image, both of the real image and the virtual image can be also displayed and recorded.

After this, the controlling and displaying instrument 25 instructs the plural bearing measuring instruments 20-1 to 20-3 to finish measuring.

Next, referring to FIGS. 5 and 6, the virtual image eliminating algorithm is explained. For example, a case, in which two intersection points 1 and 2 occurred by the measured results at the bearing measuring instruments 20-1 to 20-3 shown in FIG. 5, is explained.

First, the controlling and displaying instrument 25 makes a picture of bearing lines, based on the measured results, received from the bearing measuring instruments 20-1 to 20-3. Next, parts, in which the bearing lines intersected, are defined as intersection points. Further, all of the bearing measuring instruments, which are on the bearing lines formed each of the intersection points, are extracted.

In the case shown in FIG. 5, the bearing measuring instruments, which are on the bearing lines formed the intersection point 1, are the bearing measuring instruments 20-1 and 20-3. And the bearing measuring instruments, which are on the bearing lines formed the intersection point 2, are the bearing measuring instruments 20-1 and 20-2.

Next, in each of the combinations of the bearing lines formed the intersection point, a profile map is formed based on the distance and the configuration information (altitude information) between each of the bearing measuring instruments and the intersection point. With this profile map, the radio wave propagation loss is calculated between each of the bearing measuring instruments and the intersection point. The radio wave transmitting intensity of a radio wave transmitting source can be estimated by using the reception level measured at each of the bearing measuring instruments and the propagation loss calculated above.

When a radio wave transmitting source is real (real image), the difference between the two estimated radio wave transmitting intensity, calculated for the bearing measuring instruments whose bearing lines formed an intersection point, becomes almost equal. That is, the difference between the two estimated radio wave transmitting intensity, calculated for two bearing measuring instruments whose bearing lines formed the intersection point, is within a difference range, and the intersection point can be judged as the position of the radio wave transmitting source.

When a radio wave transmitting source is virtual (virtual image), the difference between the two estimated radio wave transmitting intensity, calculated for the bearing measuring instruments whose bearing lines formed an intersection point, does not become almost equal. That is, the difference between the two estimated radio wave transmitting intensity, calculated for two bearing measuring instruments whose bearing lines formed the intersection point, is without the difference range, the intersection point can be judged as not being the position of the radio wave transmitting source.

In the case shown in FIG. 5, as shown in FIG. 6(a), the two estimated radio wave transmitting intensity, calculated for the bearing measuring instruments 20-1 and 20-3 whose bearing lines formed the intersection point 1, becomes almost equal being within the difference range "5". That is, the difference is 65−62=3 being within the difference range "5". Therefore, the intersection point 1 can be judged as the real image being the position of the radio wave transmitting source.

However, in the case shown in FIG. 5, as shown in FIG. 6(b), the two estimated radio wave transmitting intensity, calculated for the bearing measuring instruments 20-1 and 20-2 whose bearing lines formed the intersection point 2, does not become almost equal. That is, the difference is 50−25=25 being without the difference range "5". Therefore, the intersection point 2 can be judged as the virtual image not being the position of the radio wave transmitting source. The unit of values shown in FIG. 6, is, for example, dB.

At the calculation of the radio wave propagation loss, errors, caused by, for example, multi paths and fading generated by the characteristics at the radio wave propagation, may occur. Therefore, the difference range, for judging whether the difference between the estimated radio wave transmitting intensity is almost equal or not in the combination of bearing lines, can be set or changed as an environment variable. At the embodiment of the present invention, the difference range was set to be "5", however, as mentioned above, the value of the difference range can be set to be a value by considering the explanation mentioned above.

After finishing all the processes mentioned above, the CPU 23 in the controlling and displaying instrument 25 makes the displaying section 22 display the real image and the virtual image, and also makes the recording section 24 record the displayed result with measured and calculated results.

As mentioned above, according to the first embodiment of the present invention, the judgement, whether an intersection point on the displaying section 22 is a real image or a virtual image, can be executed without depending on the skill of an observer. That is, at the conventional methods, the observer has judged whether the intersection point formed by two bearing lines is a real image or a virtual image by continuously observing the state, in which the bearing lines, measured by the bearing measuring instruments, change in the passage of time. This judged result deeply depends on the experience of the observer in his/her job at the conventional methods. However, according to the present invention, the judgement whether the intersection point is a real image or a virtual image can be executed objectively, quantitatively, and immediately, without depending on the skill of the observer.

Furthermore, according to the first embodiment of the present invention, it can be realized that the load for the observer is lessened. As mentioned above, at the conventional methods, the observer has judged whether the intersection point formed by two bearing lines is a real image or a virtual image by continuously monitoring the changing state of the bearing lines for a certain period. However, according to the present invention, the judgement whether the intersection point formed by two bearing lines is a real image or a virtual image can be executed automatically and immediately.

Next, a second embodiment of the present invention is explained. At the second embodiment, the judgement, whether an intersection point is a real image or a virtual image, is executed in a more accurate way.

At the first embodiment, in the combination of bearing lines formed an intersection point, the calculation of the estimated radio wave transmitting intensity is executed by using the once measured results, and the judgement is executed by the calculated results. However, at the second embodiment, the estimation of the radio wave transmitting intensity is executed in plural measured results at the bearing measuring instruments in the combination of bearing lines formed an intersection point. And plural estimated radio wave transmitting intensity is averaged, and this averaged result is used for judging whether the intersection point is a real image or a virtual image.

At the second embodiment, even when the reception levels measured by the bearing measuring instruments and the radio wave propagation losses have errors, caused by distortions of the radio wave by multi paths in a city region or at mountains, it becomes possible that more accurate judgement can be executed by using the averaged result.

As mentioned above, according to the embodiments of the virtual image eliminating apparatus and its method, at the time when the position of a radio wave transmitting source is measured, of the present invention, the judgement, whether an intersection point formed by two bearing lines measured by two bearing measuring instruments is a real image or a virtual image, is executed by the estimations of the radio wave transmitting intensity. Each of the estimated radio wave transmitting intensity in a combination of bearing lines formed an intersection point is calculated by using a measured reception level and a calculated radio wave propagation loss between the bearing measuring instrument and the intersection point. When the difference between the two estimated radio wave transmitting intensity in the combination of the bearing lines formed the intersection point is within a predetermined difference range, the intersection point is judged as the real image. Therefore, the judgement whether the intersection point is a real image or a virtual image can be executed objectively, quantitatively, and immediately, without depending on the skill of the observer. Further, the judgement whether the intersection point formed by two bearing lines is a real image or a virtual image can be executed automatically and immediately.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A virtual image eliminating apparatus at the time when the position of a radio wave transmitting source is measured, comprising:

plural bearing measuring instruments, positioned at different places each other, for measuring data being a bearing line and a reception level of a radio wave transmitted from said radio wave transmitting source; and a controlling and displaying instrument for displaying the position of said radio wave transmitting source by processing data, which were measured at said plural bearing measuring instruments and were transmitted to said controlling and displaying instrument, wherein:

in case that intersection points formed by said bearing lines from said plural bearing measuring instruments are two or more, said controlling and displaying instrument calculates estimated radio wave transmitting intensity in all of the combinations of bearing lines, which formed one of said two or more intersection points, and judges whether each of said two or more intersection points is a real image or a virtual image based on the difference between said estimated radio wave transmitting intensity in one combination of said bearing lines formed one of said two or more intersection points.

2. A virtual image eliminating apparatus at the time when the position of a radio wave transmitting source is measured in accordance with claim 1, wherein:

said estimated radio wave transmitting intensity is calculated from, said reception level measured at one of said plural bearing measuring instruments, and a radio wave propagation loss between one of said plural bearing measuring instruments and said intersection point in a combination of bearing lines formed said one of said two or more intersection points, calculated at said controlling and displaying instrument.

3. A virtual image eliminating apparatus at the time when the position of a radio wave transmitting source is measured in accordance with claim 1, wherein:

said difference between said estimated radio wave transmitting intensity in one combination of said bearing lines formed one of said two or more intersection points is compared with a predetermined value, when said difference between said estimated radio wave transmitting intensity in one combination of said bearing lines formed one of said two or more intersection points is said predetermined value or smaller than said predetermined value, said one of said two or more intersection points is judged as said real image, and when said difference between said estimated radio wave transmitting intensity in one combination of said bearing lines formed one of said two or more intersection points is larger than said predetermined value, said one of said two or more intersection points is judged as said virtual image.

4. A virtual image eliminating method at the time when the position of a radio wave transmitting source is measured, comprising the steps of:

measuring data being a bearing line and a reception level of a radio wave transmitted from said radio wave transmitting source by plural bearing measuring instruments positioned at different places each other;

receiving said measured data; and displaying the position of said radio wave transmitting source by processing said received measured data; wherein:

in case that intersection points formed by said bearing lines from said plural bearing measuring instruments are two or more, said virtual image eliminating method, further comprising the steps of:

calculating estimated radio wave transmitting intensity in all of the combinations of bearing lines, which formed one of said two or more intersection points; and judging whether each of said two or more intersection points is a real image or a virtual image based on the difference between said estimated radio wave transmitting intensity in one combination of said bearing lines formed one of said two or more intersection points.

5. A virtual image eliminating method at the time when the position of a radio wave transmitting source is measured in accordance with claim 4, wherein:

said estimated radio wave transmitting intensity is calculated from said reception level measured at one of said plural bearing measuring instruments and a radio wave propagation loss between one of said plural bearing measuring instruments and said intersection point in a combination of bearing lines formed said one of said two or more intersection points.

6. A virtual image eliminating method at the time when the position of a radio wave transmitting source is measured in accordance with claim 4, wherein:

said difference between said estimated radio wave transmitting intensity in one combination of said bearing lines formed one of said two or more intersection points is compared with a predetermined value, when said difference between said estimated radio wave transmitting intensity in one combination of said bearing lines formed one of said two or more intersection points is said predetermined value or smaller than said predetermined value, said one of said two or more intersection points is judged as said real image, and when said difference between said estimated radio wave transmitting intensity in one combination of said bearing lines formed one of said two or more intersection points is larger than said predetermined value, said one of said two or more intersection points is judged as said virtual image.

* * * * *